United States Patent [19]

Lytle

[11] Patent Number: 5,010,680

[45] Date of Patent: Apr. 30, 1991

[54] FISH HOOK EXTRACTION DEVICE

[76] Inventor: Robert C. Lytle, 529 13th St., Manhattan Beach, Calif. 90266

[21] Appl. No.: 569,718

[22] Filed: Aug. 20, 1990

[51] Int. Cl.[5] .......... A01K 97/00

[52] U.S. Cl. .......... 43/53.5; 43/4

[58] Field of Search .......... 43/53.5, 4, 1; 81/418; 7/106; 606/131, 138

[56] References Cited

U.S. PATENT DOCUMENTS

| | | | |
|---|---|---|---|
| 1,138,881 | 5/1915 | McFarland | 606/131 |
| 2,054,236 | 9/1936 | Behr | 43/53.5 |
| 2,294,758 | 9/1942 | Manske | 43/53.5 |
| 2,619,859 | 12/1952 | Peronto | 43/53.5 |
| 3,011,286 | 12/1961 | Wallace | 43/53.5 |
| 3,027,676 | 4/1962 | Buttemeier | 43/53.5 |
| 4,442,837 | 4/1984 | Keatley | 606/131 |

FOREIGN PATENT DOCUMENTS

| | | | |
|---|---|---|---|
| 639817 | 4/1962 | Canada | 43/53.5 |

*Primary Examiner*—Kurt Rowan

*Assistant Examiner*—Chuck Y. Mah

*Attorney, Agent, or Firm*—Fleit, Jacobson, Cohn, Price, Holman & Stern

[57] ABSTRACT

A fish hook extraction device quickly removes a fish hook embedded in a person by locating the eyelet of the hook in a hook-eye nest which is secured to a first line threaded through a neck extension of an injection molded plastic fish hook extraction device. A second line is secured about the curved portion of the hook. The second line is also threaded through the neck extension of the extraction device and secured to a rigid member, at a choice of locations, depending upon the size of the hook. An operator grasping one portion of the extraction device with two fingers locates a thumb upon a thumb pad. Upon application of pressure by the thumb on the thumb pad, the rigid member is caused to pivot about a living hinge of the device so that upon simultaneous squeezing motion of the first two fingers and the thumb, pressure is applied to the hook-eye nest which directs force downwardly through the hook to unseat the barbed end of the hook. Almost simultaneously, but slightly thereafter, due to the action of the flexible member to which the first line is secured, the second line pulls on the neck of the hook. The hook then exits the original entry hole with the hook back pressed against the entry hole while the barbed end makes minimal contact with the entry hole.

7 Claims, 2 Drawing Sheets

22
94
56
72
74
100
96
98

28
26
20
24
36
18
12
22
31
34
16
10
54
32
A
48
44
40
42
46
50
38
52
14

31
30
22
54
18
20

56
62

66
58
60
66
64

54
48
26
44
70
68
58
78
46
92
80
50
82
78
86
84
32
90
74
88

FISH HOOK EXTRACTION DEVICE

FIELD OF THE INVENTION

This invention is related to a fish hook extraction device for removal of barbed hooks accidently embedded in a person.

1. Background of the Invention

Fishing is an enjoyable hobby. However, due to the nature of having an exposed hook having a barbed end, the hook, by accident or carelessness, sometimes finds its way into the finger or other parts of a fisher-person. This occurrence often proves painful and requires an efficient and quick removal of the hook to mitigate pain and suffering.

Some examples of prior attempts to remove hooks are found in U.S. Pat. Nos. 1,777,695 to Jeffery, 2,294,758 to Manske, 3,011,786 to Wallace, and 2,054,236 to Behr.

2. Summary of the Invention

It is therefore an object of the present invention to quickly remove a fish hook embedded in a person by locating the eyelet of the hook in a hook-eye nest which is secured to a first line threaded through a neck extension of an injection molded plastic fish hook extraction device. A second line is secured about the curved portion of the hook. The second line is also threaded through the neck extension of the extraction device and secured to a rigid member, at a choice of locations, depending upon the size of the hook.

An operator grasping one portion of the extraction device with two fingers locates a thumb upon a thumb pad. Upon application of pressure by the thumb on the thumb pad, the rigid member is caused to pivot about a living hinge of the device so that upon simultaneous squeezing motion of the first two fingers and the thumb, pressure is applied to the hook-eye nest which directs force downwardly through the hook to unseat the barbed end of the hook. Almost simultaneously, but slightly thereafter, due to the action of the flexible member to which the first line is secured, the second line pulls on the neck of the hook. The hook then exits the original entry hole with the hook back pressed against the entry hole while the barbed end makes minimal contact with the entry hole.

By the present invention, a barbed hook is quickly removed through the original entry hole for the barbed end of the hook. The barbed hook is thereby extracted from human flesh with minimal damage to the flesh.

It is another object of the present invention to provide a fish hook extraction device having an upper and lower portion pivotable with respect to each other about a living hinge.

It is yet another object of the present invention to provide a fish hook extraction device having an upper and lower portion pivotable with respect to each other about a living hinge having two lines from the upper portion extending through the lower portion for pulling on a hook embedded in a person.

It is still yet another object of the present invention to provide a fish hook extraction device having an upper and lower portion pivotable with respect to each other about a living hinge having two lines from the upper portion extending through the lower portion for pulling on a hook embedded in a person with a hook-eye nest secured to one line and surrounding a hook-eye and the other line looped about a curved portion of the hook so as to cause pressure to first be applied to the hook-eye nest which directs force through the hook and unseats a barb of the hook while almost simultaneously, but slightly thereafter, pulling on the neck of the hook so that the barb exits the entry hole with minimal contact beyond the entry hole.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
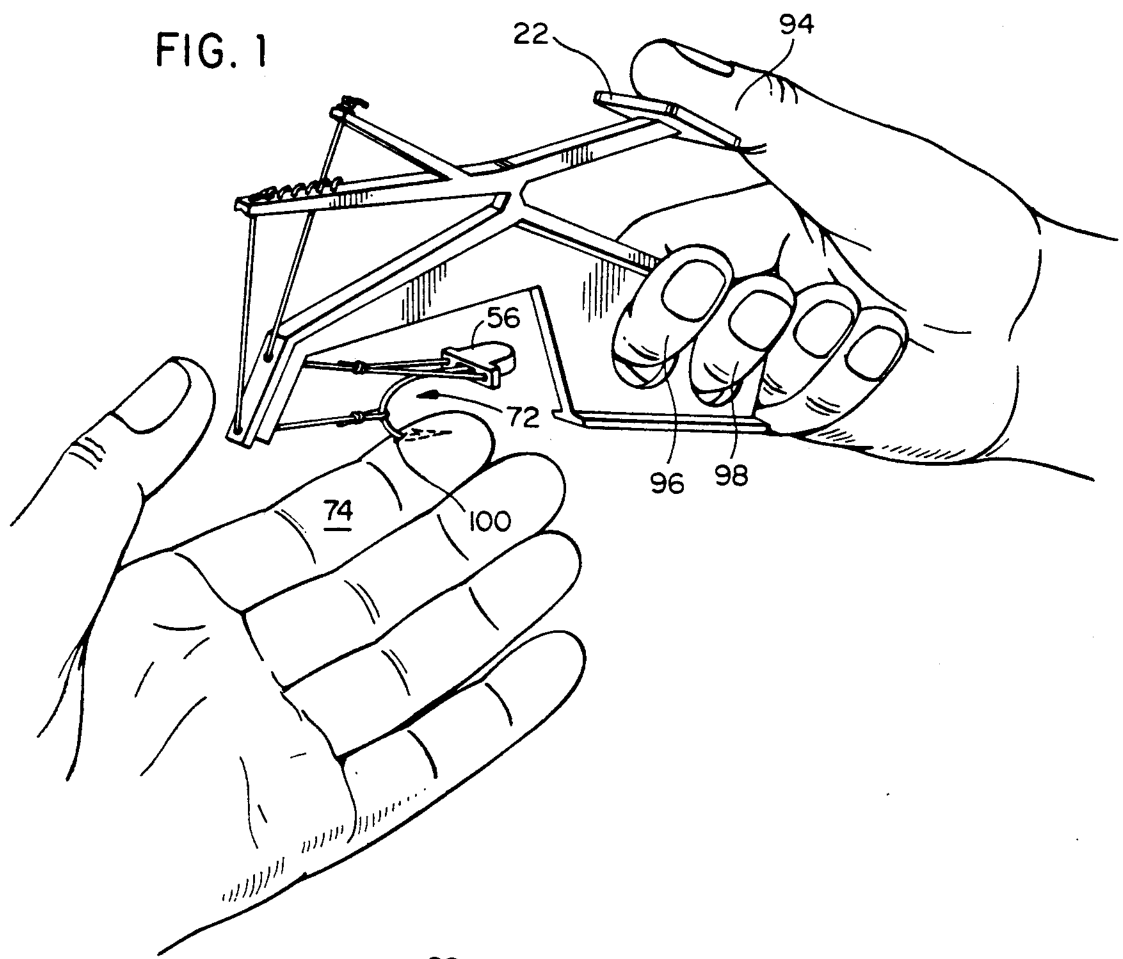
FIG. 1 is a perspective view of the hook extraction device in use.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
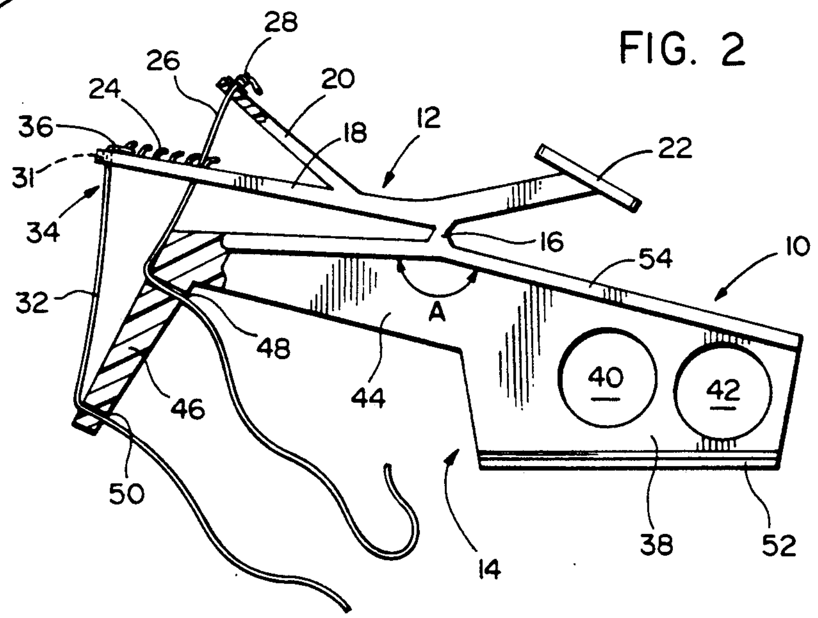
FIG. 2 is a side, partial sectional view of the hook extraction device.
Figure 3:
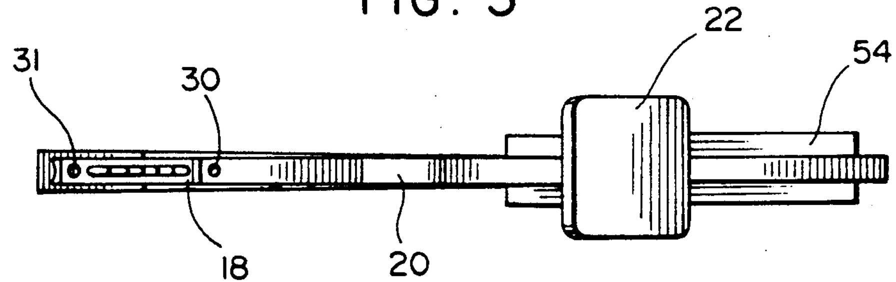
FIG. 3 is a top plan view of FIG. 2.

With reference to the drawings, in general, and to FIGS. 2 and 3, in particular, a hook extraction device embodying the teachings of the subject invention is generally designated as 10. The device 10 is made of injection molded plastic having an upper portion 12 and a lower portion 14 interconnected by a constricted portion forming a living hinge 16, providing pivotal movement between portions 12 and 14.

Upper portion 12 includes a rigid member 18 and a flexible member 20 extending from rigid member 18 at an angle of 35°. At one end of rigid member 18 is thumb pad 22. At an opposite end of rigid member 18 are a plurality of spaced hooks 24.

One end 28 of line 26 extends through a hole 30 of flexible member 20 and is knotted so as to be retained by flexible member 20. A second line 32 made of string, fishing line or other synthetic material passes through hole 31 of rigid member 18 and includes at one end 34, a loop 36 which is hooked around one of molded hooks 24 dependent upon the size of the hook to be withdrawn to shorten or lengthen second line 32, which will be explained in more detail later.

Flexible member 20 extends approximately 1.25 inches from rigid member 18. Thumb pad 22 is located approximately 1.187 inches from hinge 16. The end of the rigid member having hooks 24 is located approximately 1.875 inches from the connection with the flexible member 20 and 2.5 inches from the living hinge 16.

Lower portion 14 includes handle 38 having finger holes 40 and 42. Neck portion 44 is contiguous with handle 38 and is also continuous with neck extension 46. Neck extension 46 includes holes 48 and 50 for passage of lines 26 and 32, respectively.

At the base of handle 38 is flange 52 which extends perpendicular to the handle 38 and forms a T-shaped configuration. Similarly, spanning across the top of handle 38, neck portion 44 and neck extension 46 is a flange 54 extending perpendicular to the handle 38, neck portion 44 and neck extension 46 to form a T-shaped configuration.

Angle "A" formed between transverse extending sections of flange 54 is approximately 165° at the hinge 16. Handle 38 has a height of one inch adjacent to hole 42. Holes 40, 42 have a diameter of 0.875 inches. The length of the handle 38 is 2.125 inches. The length of the neck portion is two inches. The height of the side of the neck extension having the flange 54 is 1.437 inches, whereas the opposite side of the neck extension from the flange has a height of one inch to the intersection with the neck portion.

Figure 4:
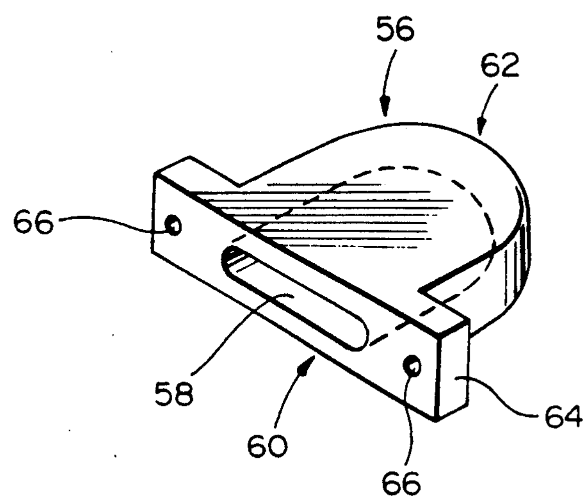
FIG. 4 is a perspective view of a hook-eye next.
Figure 5:
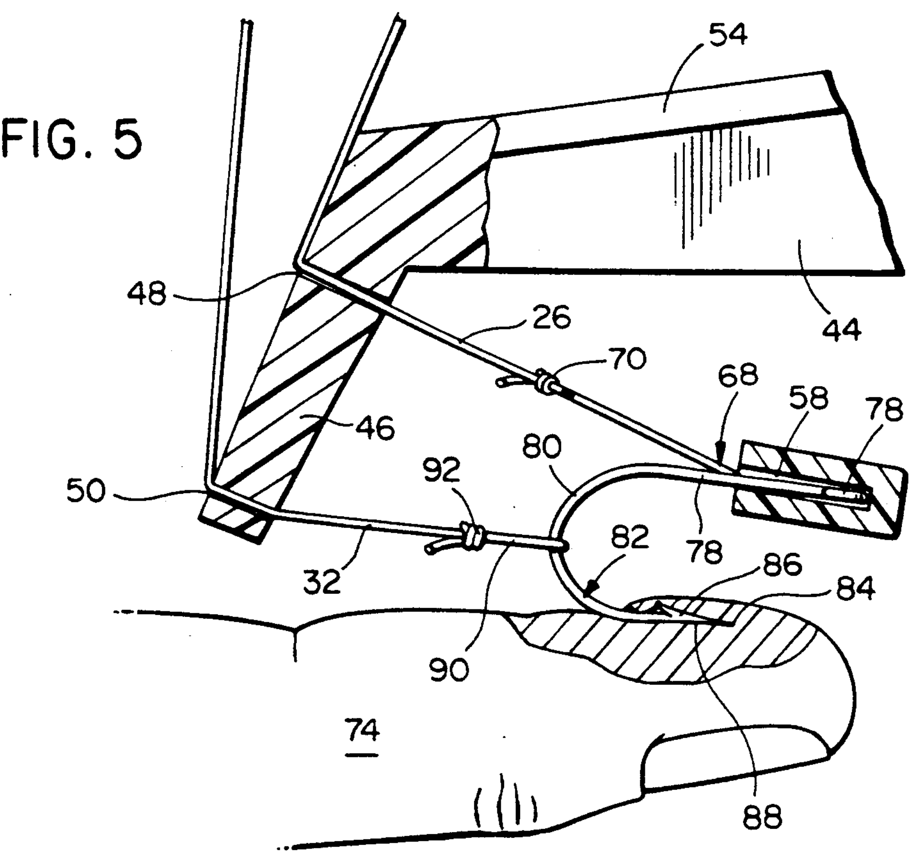
FIG. 5 is an enlarged, partial sectional view of a portion of the hook extraction device, the hook-eye nest and a hook being removed from a finger.

Another part of the hook extraction device of the invention is hook eye nest 56 as shown in FIG. 4. The hook eye nest has a thickness of approximately 0.25 inches and includes a pocket 58 extending from one end 60 and terminating short of the opposite end 62 of the hook eye nest 56. On opposite sides of a bar portion 64 are located two holes 66 through which the end 68 of first line 26 is passed and then tied back onto itself at knot 70, as shown in FIG. 5. The width, depth and height of the pocket 58 are sufficient to receive a hook eye of a hook embedded in a person.

The operation of the present invention will now be described with reference to FIGS. 1 and 5. In FIG. 1, a hook 72 is shown embedded in the forefinger 74 of a person. The hook 72 includes a hook eye 76, a shank 78, a bend 80 and a hook end 82 having a point 84, with a barb 86. Opposite to the barb 86 is a hook back 88.

A fishing line threaded through the hook eye 76 is removed. The second line 32 at end 90 is passed around the bend 80 of the hook and tied back onto itself at knot 92. A loop is thereby formed around the bend of the hook.

The loop 36 at the opposite end of second line 32 is formed after passing line 32 through hole 31 and hooked over one of the molded hooks 24 on the rigid member 18 dependent upon the size of the hook. The hole 31 stabilizes the line 32. The larger the size of the hook, the closer the loop 36 is secured on a hook 24 to the hinge 16. The space over which line 32 extends is varied by hooking line 32 over a hook 24 close to the tip of rigid member 18 for smaller hooks.

The first line 26 has previously been passed through the openings 66 of the hook eye nest at the end 68 and the opposite end 28 has been knotted through the flexible member 20. The hook eye nest is then passed over the hook eye 76 and a portion of the shank 78, as shown in FIG. 5, so that the hook eye end portion of the shank rests within the opening 58 of the hook eye nest.

With the opposite hand of the person hooked or with the assistance of another person, a thumb 94 is placed on thumb rest 22. Forefinger 96 is passed through hole 40 and middle finger 98 is passed through hole 42. Removal of the hook from the finger 74 is now ready to be accomplished.

By a simultaneous squeezing of the fingers 96, 98 and the thumb 94, pressure is first applied to the hook eye nest 56, which directs force through the hook so as to move the hook slightly further into the opening 100 through which the hook has originally penetrated. This unseats the barb 86. Almost simultaneously, but slightly thereafter due to the action of the flexible member 20, line 32 pulls the bend 80 of the hook. The hook then is retracted through the entry hole with the hook back 88 pressed downward against the side of the entry hole 100. The barb 86 therefor does not hook into the finger and makes minimal contact during its withdrawal from the entry hole.

By the use of the hook extraction device of the invention, a hook is quickly and easily retracted through its original puncture hole.

Having described the invention, many modifications thereto will become apparent to those skilled in the art to which it pertains without deviation from the spirit of the invention as defined by the scope of the appended claims.

I claim:

1. A hook extraction device comprising:

an upper portion, a lower portion pivotably secured to said upper portion, a first line having two ends, one end being secured to said upper portion, a second line having two ends, one end being secured to said upper portion, a hook eye nest secured to the other end of said first line, said hook eye nest being adapted to surround a hook eye of a hook located in a person, and a loop formed at the other end of said second line adapted to be secured to a bend of a hook located in a person so that upon pivoting of said upper portion with respect to said lower portion said first line is moved to move said hook eye nest to unseat a barb of the hook and said second line is moved to extract the hook from a finger of a person.

2. A hook extraction device as claimed in claim 1, wherein said upper portion includes a rigid member and a flexible member mounted on said rigid member with said one end of said second line being secured to said rigid member and said one end of said first line being secured to said flexible member.

3. A hook extraction device as claimed in claim 2, wherein said rigid member includes a plurality of spaced hooks for securing said one end of said second line to said rigid member.

4. A hook extraction device as claimed in claim 1, wherein said hook eye nest includes a pocket for locating a hook eye of a hook therein.

5. A hook extraction device as claimed in claim 1, wherein said upper portion includes a thumb pad and said lower portion includes at least one finger hole.

6. A hook extraction device as claimed in claim 1, wherein said upper portion and said lower portion are made of plastic.

7. A hook extraction device as claimed in claim 6, wherein said upper portion is pivotably secured to said lower portion by a living hinge.

* * * * *